US006285504B1

United States Patent
Diemeer

(10) Patent No.: US 6,285,504 B1
(45) Date of Patent: Sep. 4, 2001

(54) VARIABLE OPTICAL FILTER

(75) Inventor: Mart Diemeer, Hummelo (NL)

(73) Assignee: JDS Uniphase Inc., Nepean (CA)

(*) Notice: Subject to any disclaimer, the term of this patent is extended or adjusted under 35 U.S.C. 154(b) by 0 days.

(21) Appl. No.: 09/559,183

(22) Filed: Apr. 27, 2000

(30) Foreign Application Priority Data

Apr. 30, 1999 (CA) .................................................. 2271159

(51) Int. Cl.⁷ .............................. G02B 27/00; G02B 6/00; H01S 3/08
(52) U.S. Cl. ........................ 359/578; 359/579; 385/140; 372/92; 372/99
(58) Field of Search ................................... 359/578, 579, 359/577; 385/18, 140; 372/92, 99

(56) References Cited

U.S. PATENT DOCUMENTS

| | | | |
|---|---|---|---|
| 3,546,620 | * 12/1970 | Erickson et al. | 359/579 |
| 3,666,351 | * 5/1972 | Pao | 359/579 |
| 3,740,144 | * 6/1973 | Walker | 359/578 |
| 3,802,775 | * 4/1974 | Hughes | 359/579 |
| 5,212,584 | * 5/1993 | Chung | 359/579 |
| 5,781,332 | * 7/1998 | Ogata | 359/578 |
| 5,915,063 | * 6/1999 | Colbourne et al. | 385/140 |

* cited by examiner

*Primary Examiner*—Audrey Chang
(74) *Attorney, Agent, or Firm*—Lacasse & Associates; Randy W. Lacasse; Kevin E. Greene

(57) ABSTRACT

The present invention relates to a variable optical filter that can be used to filter an incoming signal, attenuate an incoming signal or in one configuration switch an incoming signal from one path to another. The present invention has found that an accurate and economical variable optical filter can be created by using an elastomeric material having a high coefficient of expansion in cooperation with a means for locally varying the temperature of the elastomeric material as an actuator for moving a reflective surface within the optical filter. The actuator can be operated in a controlled manner for example, to effect a tilt of the reflective surface for switching or attenuating an optical signal, or to vary the resonant wavelengths of a resonant cavity between partially reflective surfaces. In accordance with the invention there is provided, a variable optical filter comprising an input port and an output port; a first at least partially reflective disposed to receive a beam of light launched from the input port; an elastomeric material for supporting and varying the position of the at least partially reflective surface with respect to the input port; a heater for applying variable amounts of heat to the elastomeric material to move or pivot the at least partially reflective surface relative to the input port; and, control means for controlling the heater and for providing a signal to apply variable amounts of heat.

23 Claims, 4 Drawing Sheets

III–III

VARIABLE OPTICAL FILTER

This invention relates to a variable optical filter that can be used to filter an incoming signal, attenuate an incoming signal or in one configuration switch an incoming signal from one path to another.

An optical attenuator that can serve as an optical switch is known, and is described in recently issued U.S. Pat. No. 6,031,946 in the name of Bergmann et al. assigned to Lucent Technologies. Bergmann et al. disclose a moving mirror that includes a focusing element adapted to focus an incoming beam transmitted from an input optical port, a movable mirror and an actuator. The actuator moves the mirror into two switching positions that correspond to pass-through and reflective switching states, or alternatively the actuator moves the mirror enough to achieve attenuation of the signal, thereby operating as a variable attenuator.

Another U.S. Pat. No. 5,915,063 in the name of Colbourne et al. assigned to JDS Uniphase, Inc. discloses a mirror supported by a movable flexure member that serves as a variable attenuator. The prongs of the flexure member are each connected to an actuator, which can expand or contract in response to a control signal applied thereto. The control signal may be heat, an electric field, a magnetic field or, preferably, a combination thereof. The attenuator is positioned opposite a pair of optical waveguides so that an input optical signal from an input waveguide is incident on the mirror and, upon reflection, is received by the second waveguide. Attenuation of the transmission is effected by controlled tilting of the mirror caused by appropriate control signals, single or in combination, applied to one or both of the actuators.

Although the device disclosed by Colbourne et al. achieves its intended function and is highly accurate, it is somewhat costly to produce, and through attempts to provide a low cost easy to manufacture device that could be made in a bulk fashion, the instant invention was conceived.

It is therefore an object of this invention to provide a low cost filter that in one embodiment can serve as an attenuator.

It is also an object of this invention to provide a low cost filter that will serve as a variable etalon or optical cavity having a variable or tunable output response.

It is further conceivable to use the filter as an optical switch, or multiplexor.

STATEMENT OF THE INVENTION

The present invention has found that an accurate and economical variable optical filter can be created by using an elastomeric material having a high coefficient of expansion in cooperation with a means for locally varying the temperature of the elastomeric material as an actuator for moving a reflective surface within the optical filter. The actuator can be operated in a controlled manner for example, to effect a tilt of the reflective surface for switching or attenuating an optical signal, or to vary the optical path length of a resonant cavity between partially reflective surfaces.

In accordance with the invention there is provided, a variable optical filter comprising: an input port and an output port;
  a first at least partially reflective surface disposed to receive a beam of light launched from the input port;
  an elastomeric material for supporting and varying the position of the at least partially reflective surface with respect to the input port;
  a heater for applying variable amounts of heat to the elastomeric material to move or pivot the at least partially reflective surface relative to the input port; and,
  control means for controlling the heater and for providing a signal to apply variable amounts of heat.

In accordance with the invention there is further provided, an optical filter for varying a beam of light launched therein, comprising:
  a fixed input port for receiving the beam of light;
  an at least partially reflective surface positioned by an elastomeric material in a first position with respect to the fixed input port to receive light therefrom, the elastomeric material having a coefficient of thermal expansion that is at least $(200 \times 10 \exp\text{-}6)/K$, and, means for locally controllably varying the temperature of at least a portion of the elastomeric material to relatively vary the position of the at least partially reflective surface with respect to the fixed input port.

In accordance with the invention, there is yet further provided, an optical filter for varying a beam of light launched therein, comprising:
  a fixed input port for receiving a beam of light;
  first and second spaced at least partially reflective surfaces disposed to form a resonant cavity having an input port and an output port and having a first set of resonant wavelengths when the surfaces are in a first position, the reflective surfaces being spaced by a spacer element comprising an elastomeric material, the elastomeric material having a coefficient of thermal expansion that is sufficient to vary the optical pathlength of the filter and,
  means for locally controllably varying the temperature of at least a portion of the elastomeric material to selectively vary the optical pathlength of the of the resonant cavity by moving at least one of the first and the second surfaces to a second position having a second set of resonant wavelengths.

Advantageously, filters in accordance with the present invention can be more simply manufactured with very accurate control.

It should be understood that within this specification, the term "filter" used in accordance with this invention is meant to encompass at least, an attenuating filter, a multiplexing filter, a periodic filter and, or, a switching filter.

BRIEF DESCRIPTION OF THE DRAWINGS

FIG. 1b shows an alternative embodiment of the filter of FIG. 1a;

FIG. 2 is a schematic plan view of the variable optical filter of FIG. 1a;

DETAILED DESCRIPTION OF PREFERRED EMBODIMENTS

Figure 1A:
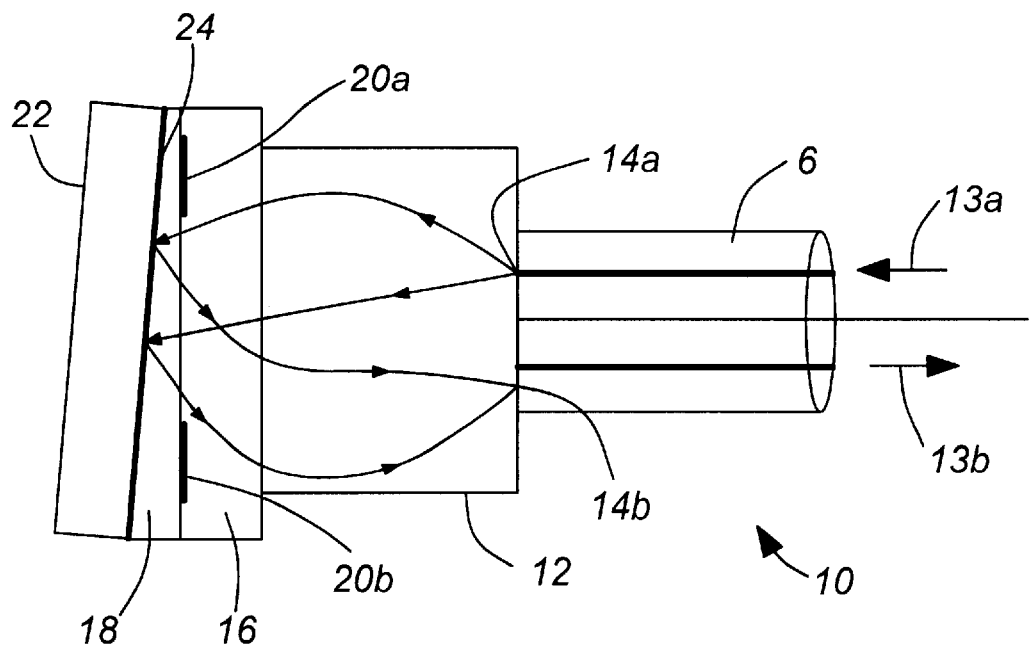
FIG. 1a shows a variable filter in accordance with the invention as a schematic illustration in use as an attenuator.

A first embodiment of a tunable filter in the form of an attenuator is shown generally at 10 in FIG. 1a. In the preferred embodiment of FIG. 1a, an optical fibre tube 6 provides an input and an output port 14a and 14b at an end face of a collimating quarter pitch, graded-index (GRIN) lens 12 to which they are coupled. The lens 12 is coupled at its opposite end to a glass block spacer 16. The glass block spacer 16 is coated on its opposite side with a light transmissive polymer elastomer layer 18 such as of GE: RTV 655 or a suitable rubbery material having a coefficient of thermal expansion of about at least $200 \times 10^{-6}$/K. Spaced heaters 20a and 20b are disposed a distance apart for heating separate regions of the polymer elastomer 18. The polymer layer 18 is coupled to a mirror 24 supported by a silicon substrate 22.

The polymer 18 can be expanded locally by powering one of the two thin film heaters 20a and 20b deposited onto opposite edges of the substrate 22. This will tilt the mirror 24 and shift the image of the spot from the input fibre at port 14a away from the output fibre at port 14b, thus inducing attenuation by coupling loss. The device utilizes the high linear thermal expansion coefficient in rubbery polymers that can have values in excess of $300 \times 10^{-6}$ $K^{-1}$. This effect is further amplified by a factor of 3 due to the constrained in-plane expansion of the polymer. This yields an exceptionally high relative expansion of $10^{-4}$ $K^{-1}$. The low thermal conductivity of polymers, which is 0.2 W/m.K, compared with fused silica which has a thermal conductivity of 1.4 W/m.K or silicon having 84 W/m.K, allows the generation of strong thermal gradients over the chip surface, thus yielding high tilt angles. As a further advantage, polysiloxane elastomers used in the present invention have long term temperature stability of over 200 degrees C. The speed of the attenuator is determined by the thermal diffusion process through the polymer layer stack and is dependent upon whether the substrate opposite to the heater has a large thermal conductivity, such as silicon. The substrate does not have to function as a heat sink because the attenuator operates on temperature differences: a uniform bias temperature does not induce a mirror tilt. Therefore the substrate's ability to quickly spread heat is a consideration.

A rough estimation of the rise/fall time in the instance that a heat spreader is present, can be derived from the behaviour of a plane heater on a heat sinked layer. The rise time $\tau$, in the middle of the layer can be calculated from:

$$\kappa.\tau/L^2 \sim 1,$$

where $\kappa \sim 10^{-7}$ $m^2/s$, is the thermal diffusivity of the polymer layer, and L is the layer thickness. See "Integrated Optical Circuits and Components", ed. E. J. Murphy, publ. Marcel Dekker Inc. Chap. 8, Polymeric Thermo-Optic Switches, Mart Diemeer et al.

For a thickness of 50 $\mu$m, a rise/falltime of 25 ms can be expected.

Figure 1B:
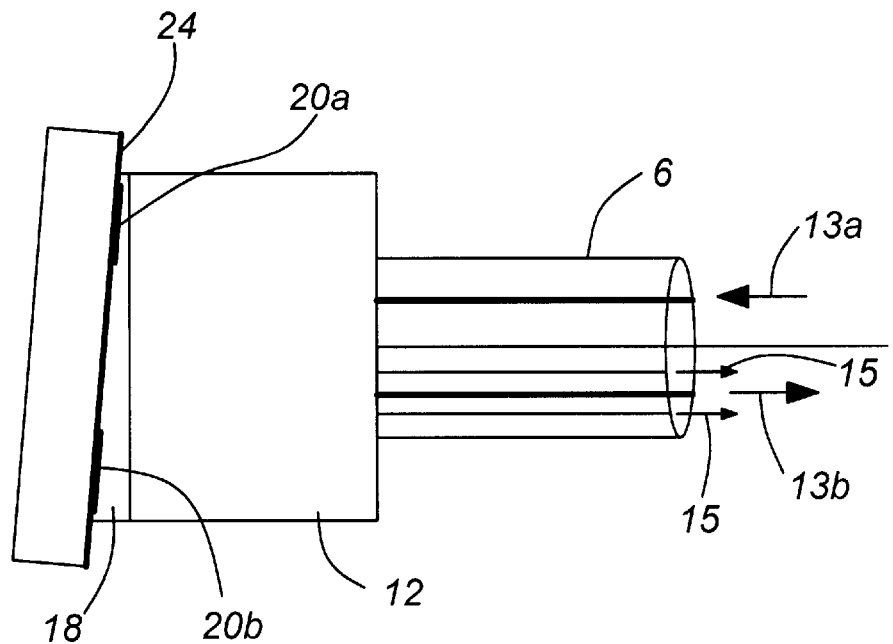
Figure 2:
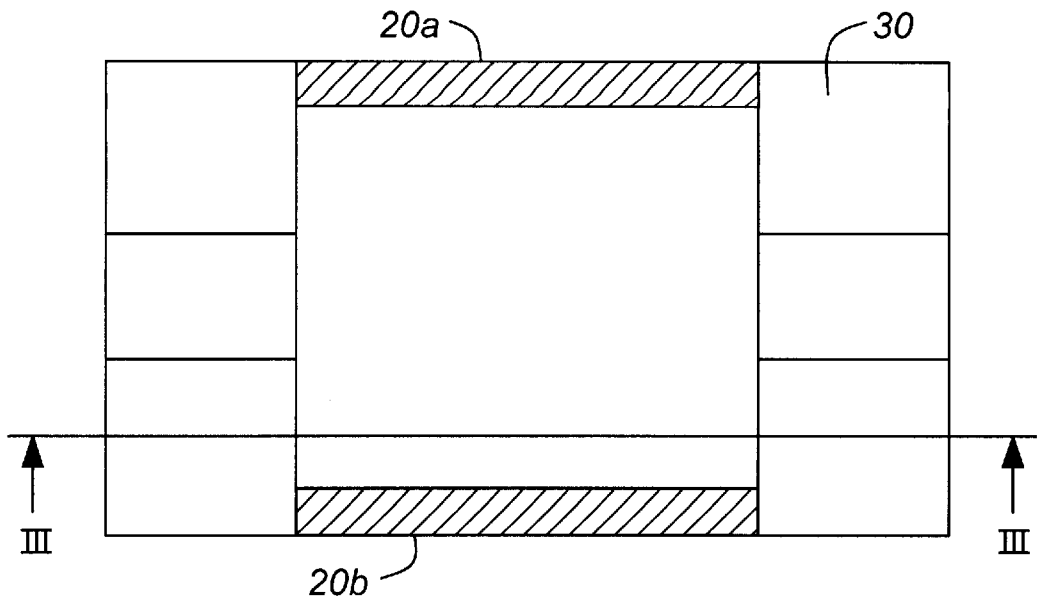
Figure 3:
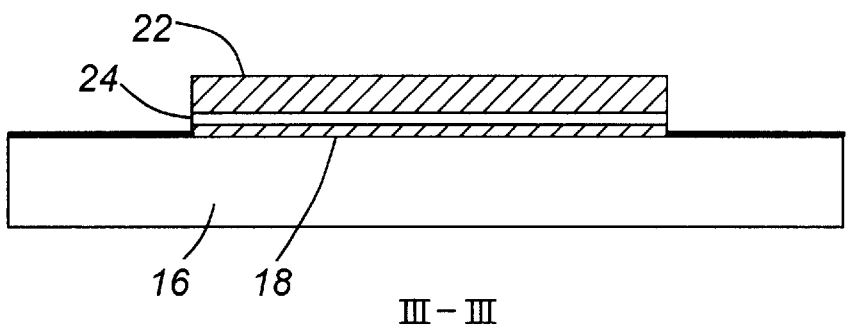
FIG. 3 is a cross-section through line III—III of FIG. 2.

FIGS. 2 and 3 illustrate the variable filter embodiment of FIG. 1a in plan and cross sectional views. Heater stripes 20a and 20b at opposite margins of the mirror polymer assembly. are preferably 100 nm nickel on 5 nm chromium for good stability. Two heaters on opposite sides of the chip allow for push-pull operation: one heater can be cooled down, while the other can be heated up. This improves the speed of the device. A Pyrex spacer 16 of approximately 3.5 mm by 7 mm can support the filter. Bondpads 30 of 100 nm nickel on 5 nm chromium covered by 50 nm gold are positioned at the corners of the Pyrex spacer 16. As seen clearly in the cross-sectional view of FIG. 3, a silicon substrate 22 of approximately 3 mm by 3 mm and 0.525 mm thickness supports a gold mirror and a polymer layer of light transmissive material is bonded between the mirror 24 and the Pyrex spacer 16. The preferred polymer is approximately 50 $\mu$m thick and is a two component RTV polysiloxane (silicone rubber) of GE: RTV 655. Its useful temperature range is between −110 C to 204 C. Its expansion coefficient is $330 \times 10^{-6}$ $K^{-1}$. The layer thickness is fixed at 50 micron by using Chromel spacerwires of 0.002" thickness between the Pyrex spacer 16 and the silicon substrate 22. The polymer and the heaters should be highly temperature stable for reliable operation. In an alternative embodiment shown in FIG. 1b, a Pyrex spacer is not applied. A glass substrate 23 with a mirror 24 and the heaters 20a, 20b is directly attached to the collimating GRIN lens 12 by the polymer elastomer 18.

Figure 4:
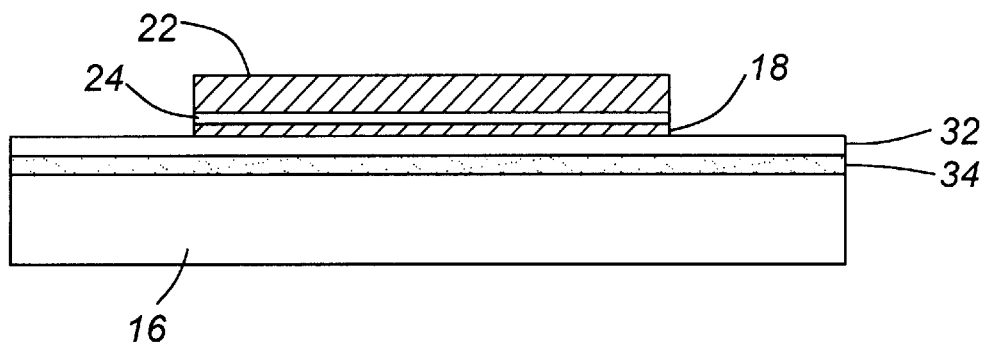
FIG. 4 is a schematic cross-section of an alternative variable filter in accordance with the present invention.

In another alternative embodiment shown in FIG. 4, the heaters 20a and 20b are deposited onto a thin (100 $\mu$m) glass substrate 32 that is adhered with a polymer adhesive layer 34 onto a thick glass substrate 16. This improves the thermal isolation of the heaters 20a, 20b.

It will be easily understood that input port 14a and output port 14b can be the same port with the use of a circulator or directional coupler.

Figure 5:
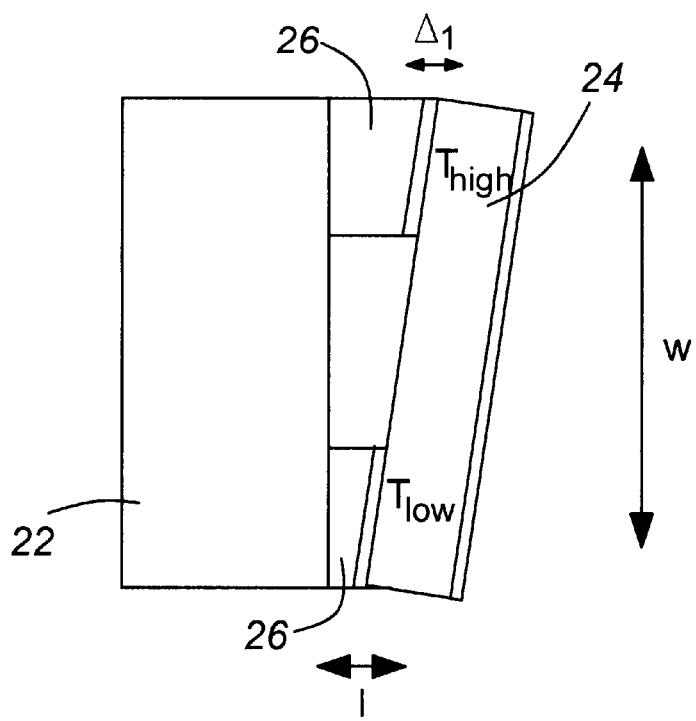
FIG. 5 is a schematic illustration of an alternative variable filter structure in accordance with the invention.
Figure 6:
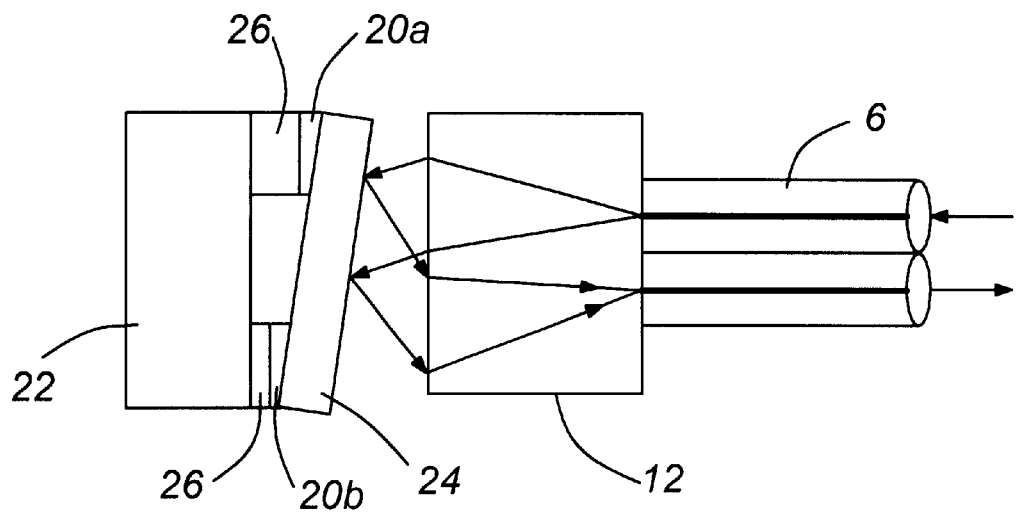
FIG. 6 is a schematic illustration of the variable filter structure of FIG. 5 in an assembly demonstrating the ray paths of an optical signal in use as an attenuator.

FIGS. 5 and 6 illustrate an alternative embodiment of a variable filter in accordance with the invention, wherein the polymer having a high coefficient of thermal expansion is applied to support a mirror 24 behind the reflective surface, instead of providing a layer of light transmissive polymer that entirely covers the reflective surface of the mirror 24. The polymer is provided as discrete spacers 26, or can be applied as a continuous layer. There is free space between the lens 12 and the mirror 24, as illustrated. Lens 12 and substrate 22 are both fixed, for instance to the wall of a housing (not shown), while mirror substrate 24 is free to move within the free space. Heaters 20a, 20b at the backside of the mirror substrate 24 with spacers 26 provide the tilting.

In both embodiments shown in FIGS. 1a and 1b, and FIGS. 5 and 6, a same principle is utilized, wherein heating one region or wherein differentially heating or, heating and cooling different regions, provides tilting of the mirror 24 with respect to an input beam of light.

The operation of the attenuator shown in FIG. 6 is as follows. The polymer spacers 26 are used to tilt the mirror by differential thermal expansion. This requires the application of heat or cooling in a differential manner to the spacers 26. The mirror 24 shifts the focused light received from an endface of an input fibre 13a at input port 14a over the endface of the output fibre 13b at output port 14b, thereby attenuating the optical signal in a degree that depends on the tilt angle. For example, when optimum coupling exists and essentially all of the focused light is reflected into the end of the output fibre 13b, no attenuation is provided; however, if the mirror 24 is tilted from the coupling position where all of the light is coupled from the input to output waveguides, much poorer coupling will exist as a portion of the focused beam will miss the end face of the output fibre. Heat can be applied continuously to increase the tilt angle until a desired attenuation results, in steps or variable amounts in order to create a desired differential temperature between the two heaters 20a, 20b.

In the embodiment shown in FIGS. 5 and 6 the polymer spacers 26 have a thickness of 30 $\mu$m and a separation w=1 mm, and yield a tilt angle of 0.0016 degrees per degree K temperature difference between the spacers 26. The required tilt angle for 15 dB attenuation is 0.07 degrees using a SLW-4.0 SELFOC grin lens. This corresponds to a temperature difference of 44 K. Response times are be of the order of 1 ms. The spacer thickness is not critical and can be increased to enhance the tilting efficiency at the expense of response time. The operation of FIG. 1a is similar, wherein differential heat applied to the two regions shown covered by heaters varies the tilt angle, and light is either efficiently coupled from the input waveguide to the output waveguide or, the light is shifted by tilting the mirror and does not couple well into the output waveguide. Switching between multiple output ports can also be achieved in this manner.

Control circuitry typically used in such variable attenuators can be used in this instance to control the heaters. In the instance where the mirror is purposefully coated with a partially transmissive coating allowing from 1 to a few percent of the light out, a monitor port can be provided at a back side of the mirror to provide a control signal to the heaters in dependence upon the intensity of light detected. Alternatively, as shown in FIG. 1b, pick up fibres 15 can be positioned about the output port 14b with suitable detectors as an internal spilled light tap. Such a spilled light tap, in combination with an input tap, can be used to determine the percentage of attenuation. A tap coupler to the output fibre can be used for the same purpose.

Figure 7:
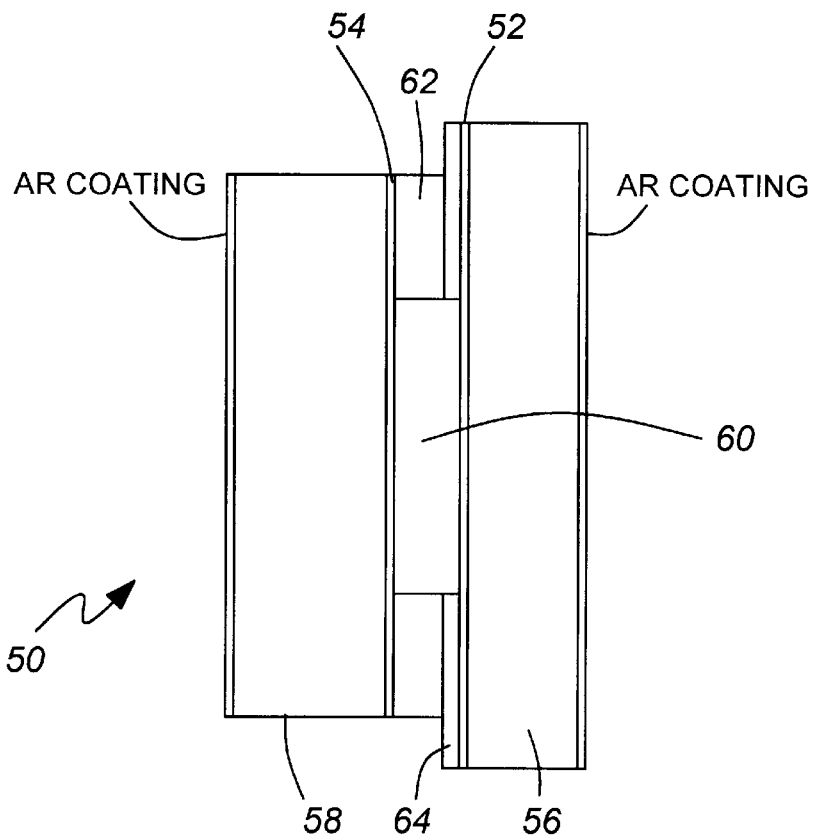
FIG. 7 is a schematic illustration of an etalon structure in accordance with the present invention.

Another type of filter that can be provided in accordance with this invention is a variable output response etalon, shown generally at 50 in FIG.7, wherein either the optical pathlength of the etalon is varied for example in dependence upon thermal expansion of a polymer spacer which determines the dimension of the resonant cavity or wherein the tilt angle between two at least partially reflective surfaces defining the etalon cavity is varied for example upon thermal expansion difference between polymer cavity spacer regions.

Turning now to FIG. 7 in detail, an air-cavity etalon 50 is shown having a first at least partially reflective surface 52 coated on a glass and or silicon substrate wafer 56 and a second at least partially reflective surface 54 coated on a glass and or silicon substrate wafer 58. A resonant cavity 60 is isolated between the reflective surfaces 52, 54 by spacers 62 of polymer elastomer having a high coefficient of expansion. Each polymer spacer 62 includes an associated heater 64. The polymer spacers 62 can be expanded thermally by powering thin film heaters 64 that are deposited onto the substrates 56, 58. The polymer spacers 62 can be formed as a layer that has at least one aperture for light transmission to create a Fabry Perot etalon with at least one cavity 60. The use of an air cavity 60 circumvents the counteracting effect of the thermal change of the refractive index in polymers (polymers have a large negative thermo-optic coefficient). The optical pathlength tuning of the etalon is by thermal expansion of the polymer layer alone.

The device utilizes the high linear thermal expansion coefficient in rubbery polymers of 0.0003 $K^{-1}$. The thermal expansion is further amplified by a factor of 3 due to the constrained in-plane expansion of the polymer. This yields an exceptionally high relative optical pathlength change of 0.0009 $K^{-1}$. The shift of the peak transmission wavelength per degree temperature increase is the product of this change and the operational wavelength. At 1550 nm, it is 1.4 nm/$K^{-1}$.

The required polymer layer thickness, and thus cavity length, for a free spectral range that covers the EDFA (40 nm) window is 30 μm. This is within a range that can be spincoated with ease. Extended free spectral ranges require even thinner layers, since the free spectral range is inversely proportional to the cavity length. The required temperature increase to tune over the EDFA window is only 29 K. Wafers of glass and/or silicon are selected dependent on the required response time. Heater formation is conveniently achieved by standard evaporation/sputtering processes and photolithography. Commercially available photodefinable polysiloxanes are preferred as spacer material. The bandwidth (BW) and finesse (FSR/BW) of the etalon are determined by the mirror properties and the tilt angle of the mirrors. The control by dithering will be limited by thermal diffusion to about 1 kHz. Alternative control mechanisms that can be used include the absolute temperature via the resistance of the nickel heaters or the capacitance of a built-in capacitor based on the air cavity.

Figure 8:
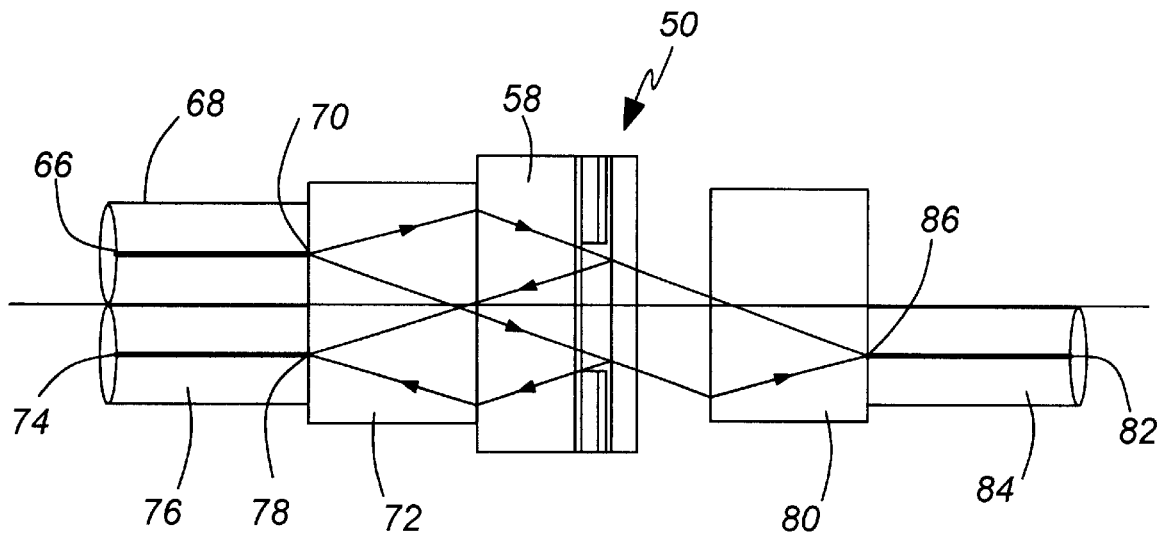
FIG. 8 is a schematic illustration of the etalon structure of FIG. 7 in an assembly demonstrating the ray paths of an optical signal.

FIG. 8 shows a schematic illustration of the fibre pigtailed etalon component in accordance with the invention. An input fibre 66 is supported in a fibre tube 68 coupled to an input port 70 of a quarter pitch GRIN lens 72. The GRIN lens 72 is coupled to the substrate 58. Light launched through the GRIN lens 72 is separated by the wavelength resonance of the etalon 50 and the nonresonant wavelengths are reflected back through the GRIN lens 72 to a reflected output fibre 74 supported in a fibre tube 76 at a reflected output port 78 of the GRIN lens, while the resonant wavelengths are transmitted through an additional GRIN lens 80 to a transmitted output fibre 82 supported in a fibre tube 84 at a transmitted output port 86 of the GRIN lens 80.

The polymer spacers 62 can also be used to change the degree of parallelism of the at least partially reflective surfaces 52, 54 forming the resonant cavity 60. As a result, by applying a differential temperature change to the polymer spacers 62 tilting at least one of the at least partially reflective surfaces 52, 54, a change can be effected to the value of finesse of the resonant cavity 60.

What is claimed is:

1. A variable optical filter comprising:

an input port and an output port;

a first at least partially reflective surface disposed to receive a beam of light launched from the input port;

an elastomeric material for supporting and varying the position of the at least partially reflective surface with respect to the input port;

a heater for applying variable amounts of heat to the elastomeric material to move or pivot the at least partially reflective surface relative to the input port; and, control means for controlling the heater and for providing a signal to apply variable amounts of heat.

2. A variable optical filter as defined in claim 1, wherein the elastomeric material is light transmissive and comprises a layer substantially covering the first at least partially reflective surface.

3. A variable optical filter as defined in claim 1, wherein the heater includes means for applying heat differentially across the elastomeric material.

4. A variable optical filter as defined in claim 1 further comprising a second at least partially reflective surface disposed to receive light from the first at least partially reflective surface, the two at least partially reflective surfaces forming a filter having an output response that varies as heat is applied by the heater.

5. A variable optical filter as defined in claim 4 further including a reflected output port and a transmitted output port.

6. A variable optical filter as defined in claim 1, wherein multiple output ports are provided for receiving at least some light dependent upon the position of the at least partially reflective surface.

7. A variable optical filter as defined in claim 6, wherein at least one of the multiple output ports comprises an internal spilled light tap for measuring spilled light associated with attenuation.

8. An optical filter for varying a beam of light launched therein, comprising:

a fixed input port for receiving the beam of light;

an at least partially reflective surface positioned by an elastomeric material in a first position with respect to the fixed input port to receive light therefrom, the elastomeric material having a coefficient of thermal expansion that is at least (200×10 exp-6)/K, and, means for locally controllably varying the temperature of at least a portion of the elastomeric material to relatively vary the position of the at least partially reflective surface with respect to the fixed input port.

9. An optical filter as defined in claim 8, wherein the means for locally controllably varying the temperature includes means for applying heat differentially across the elastomeric material.

10. An optical filter as defined in claim 9, wherein the means for applying heat differentially across the elastomeric material comprises two heaters each on an opposite side of the elastomeric material.

11. An optical filter for varying a beam of light as defined in claim 8 further comprising a second fixed port disposed to receive at least some light launched into the fixed input port along a first path.

12. An optical filter as defined in claim 11, wherein the elastomeric material is absent from the first path.

13. An optical filter as defined in claim 11, wherein the elastomeric material is light transmissive to permit a beam launched into the input port to propagate through the elastomeric material prior to being incident upon the at least partially reflective surface, and is in the form of a layer covering at least a portion of the at least partially transmissive surface.

14. An optical filter as defined in claim 8, wherein the filter is an optical attenuator for controllably attenuating a beam of light launched along the first path.

15. An optical filter as defined in claim 8, further comprising a substantially collimating lens coupled between the fixed input port and the at least partially reflecting surface.

16. An optical filter as defined in claim 15, wherein the at least partially reflecting surface is a mirror.

17. An optical filter as defined in claim 16, wherein the lens is a GRIN lens and wherein the elastomeric material comprises a layer of material bonded between an end face of the GRIN lens and the mirror.

18. An optical filter as defined in claim 17, wherein the GRIN lens has a first port and a second port each disposed a distance from an optical axis of the lens.

19. An optical filter as defined in claim 18, further comprising a light transmissive spacer disposed between the end face of the GRIN lens and the mirror.

20. An optical filter for varying a beam of light launched therein, comprising:

a fixed input port for receiving a beam of light;

first and second spaced at least partially reflective surfaces disposed to form a resonant cavity having an input port and an output port and having a first response when the surfaces are in a first position, the reflective surfaces being spaced by a spacer element comprising an elastomeric material, the elastomeric material having a coefficient of thermal expansion that is sufficient to vary the response of the filter and, means for locally controllably varying the temperature of at least a portion of the elastomeric material to selectively vary a second response of the resonant cavity by moving at least one of the first and the second surfaces to a second position.

21. An optical filter as defined in claim 20, wherein the first response comprises a first set of resonant wavelengths and the second response comprises a second set of resonant wavelengths; and wherein the thermal expansion of the elastomeric material varies an optical pathlength of the filter.

22. An optical filter as defined in claim 20, wherein the first response comprises a first value of finesse of the resonant cavity, and the second response comprises a second value of finesse of the resonant cavity; and wherein the thermal expansion of the elastomeric material varies a degree of parallelism of the first and the second surfaces by tilting at least one of the first and the second surfaces.

23. An optical filter as defined in claim 20, wherein the elastomeric material has a coefficient of thermal expansion that is at least (200×10 exp-6)/K.

* * * * *